United States Patent [19]
Hsu et al.

[11] Patent Number: 5,976,332
[45] Date of Patent: Nov. 2, 1999

[54] ULTRA-HIGH EFFICIENCY TURBINE AND CELL COMBINATION

[75] Inventors: Michael S. Hsu, Lincoln; Ethan D. Hoag, East Boston, both of Mass.

[73] Assignee: Ztek Corporation, Waltham, Mass.

[21] Appl. No.: 08/977,835

[22] Filed: Nov. 26, 1997

Related U.S. Application Data

[63] Continuation of application No. 08/325,486, Oct. 19, 1994, Pat. No. 5,693,201, which is a continuation-in-part of application No. 08/287,093, Aug. 8, 1994, Pat. No. 5,501,781, which is a continuation-in-part of application No. 08/215,466, Mar. 21, 1994, abandoned.

[51] Int. Cl.$^6$ .............................. C25B 9/00; C25B 15/08; H01M 8/04
[52] U.S. Cl. .............................. 204/241; 204/269; 429/26
[58] Field of Search .................................. 204/269–270, 204/274–278, 241; 429/26, 16, 31

[56] References Cited

U.S. PATENT DOCUMENTS

| | | | |
|---|---|---|---|
| 3,505,114 | 4/1970 | Rohr | 136/86 |
| 3,607,427 | 9/1971 | White | 136/86 |
| 3,616,334 | 10/1971 | Aker et al. | 204/129 |
| 3,964,930 | 6/1976 | Reiser | 136/86 |
| 4,041,210 | 8/1977 | Van Dine | 429/16 |
| 4,056,452 | 11/1977 | Campbell | 204/258 |
| 4,085,016 | 4/1978 | Janjua et al. | 204/104 |
| 4,087,976 | 5/1978 | Morrow, Jr. et al. | 60/643 |
| 4,197,362 | 4/1980 | Schmidberger et al. | 429/12 |

(List continued on next page.)

FOREIGN PATENT DOCUMENTS

| | | |
|---|---|---|
| 0 170 277 | 2/1986 | European Pat. Off. . |
| 0 246 649 | 11/1987 | European Pat. Off. . |
| 0 374 636 | 6/1990 | European Pat. Off. . |
| 0 399 077 | 11/1990 | European Pat. Off. . |
| 0 400 701 | 12/1990 | European Pat. Off. . |
| 0 530 451 | 3/1993 | European Pat. Off. . |
| 1436747 | 7/1966 | France . |
| 58-005974 | 1/1983 | Japan . |
| 60-195880 | 10/1985 | Japan . |
| 61-24169 | 2/1986 | Japan . |
| 64-84578 | 3/1989 | Japan . |
| WO92/07392 | 4/1992 | WIPO . |
| WO94/13026 | 6/1994 | WIPO . |

OTHER PUBLICATIONS

M. Hsu, "Lightweight Zirconia Power Package for Space Applications" *Proceedings of the 26th Intersociety Energy Conversion Engineering Conference*, Boston (Aug. 4–9, 1991, Institute of Electrical and Electronics Engineers) vol. 3, pp. 498–503, Aug. 4, 1991.

M. Hsu et al., "Planar Solid Oxide Fuel Cell Technology Development" *Proceedings of the 26th Intersociety Energy Conversion Engineering Conference*, Boston (Aug. 4–9, 1991, Institute of Electrical and Electronics Engineers) vol. 3, pp. 606–610, Aug. 4, 1991.

M. Krumpelt et al., "*Systems Analyses for High–Temperature Fuel Cells*", *Extended Abstracts*, Abstract No. 178, Princeton, New Jersey, vol. 87, pp. 261–262 (Oct. 1987).

*Primary Examiner*—Donald R. Valentine
*Attorney, Agent, or Firm*—Lahive & Cockfield, LLP; Anthony A. Laurentano

[57] ABSTRACT

A turbine power system that includes a compressor for compressing a first medium, and an electrochemical converter in communication with the compressor and adapted to receive the first medium and a second medium. The converter is configured to allow an electrochemical reaction between the first and second mediums, thereby generating electricity and producing exhaust having a selected elevated temperature. The power system further includes a turbine in fluid communication with the electrochemical converter and adapted to receive the converter exhaust, such that the turbine converts the electrochemical converter exhaust into rotary energy and electricity. The system can further include a steam generator and a steam turbine that produces electricity. The electrochemical converter is utilized herein as an electrochemical combustor-replacement (ECCR) or as a fuel cell for combustor-replacement (FCCR).

93 Claims, 5 Drawing Sheets

U.S. PATENT DOCUMENTS

| | | | |
|---|---|---|---|
| 4,310,605 | 1/1982 | Early et al. | 429/18 |
| 4,482,440 | 11/1984 | Kadija | 204/105 |
| 4,490,445 | 12/1984 | Hsu | 429/32 |
| 4,574,112 | 3/1986 | Breault et al. | 429/26 |
| 4,583,583 | 4/1986 | Wittel | 165/46 |
| 4,629,537 | 12/1986 | Hsu | 204/15 |
| 4,644,751 | 2/1987 | Hsu | 60/676 |
| 4,721,556 | 1/1988 | Hsu | 204/258 |
| 4,853,100 | 8/1989 | Hsu | 204/256 |
| 4,923,768 | 5/1990 | Kaneko et al. | 429/19 |
| 5,035,727 | 7/1991 | Chen | 55/16 |
| 5,083,425 | 1/1992 | Hendriks et al. | 60/39.183 |
| 5,161,369 | 11/1992 | Williams | 60/226.1 |
| 5,212,023 | 5/1993 | Diethelm | 429/26 |
| 5,338,622 | 8/1994 | Hsu et al. | 429/26 |
| 5,347,806 | 9/1994 | Nakhamkin | 60/39.161 |
| 5,360,679 | 11/1994 | Buswell et al. | 429/19 |
| 5,387,399 | 2/1995 | Nishida et al. | 422/171 |
| 5,413,879 | 5/1995 | Domeracki et al. | 429/30 |
| 5,449,568 | 9/1995 | Micheli et al. | 429/20 |
| 5,462,817 | 10/1995 | Hsu | 204/256 X |
| 5,693,201 | 12/1997 | Hsu et al. | 204/241 |

ULTRA-HIGH EFFICIENCY TURBINE AND CELL COMBINATION

RELATED APPLICATIONS

This application is a continuation application of Ser. No. 08/325,486 (now U.S. Pat. No. 5,693,201) filed on Oct. 19, 1994 (will issue Dec. 2, 1997), which in turn is a continuation-in-part application of Ser. No. 08/287,093, filed on Aug. 8, 1994 (now U.S. Pat. No. 5,501,781, issued on Mar. 26, 1996) and Ser. No. 08/215,466, filed on Mar. 21, 1994 (now abandoned). The contents of all of the aforementioned application(s) are hereby incorporated by reference.

BACKGROUND OF THE INVENTION

This invention relates to gas or steam turbines, and specifically to high performance power systems employing such devices.

Conventional high performance gas turbine power systems exist and are known. Prior gas turbine power systems include a compressor, a combustor, and a mechanical turbine, typically connected in-line, e.g., connected along the same axis. In a conventional gas turbine, air enters the compressor and exits at a desirable elevated pressure. This high-pressure air stream enters the combustor, where it reacts with fuel, and is heated to a selected elevated temperature. This heated gas stream then enters the gas turbine and expands adiabatically, thereby performing work. One deficiency of gas turbines of this general type is that the turbine typically operates at relatively low system efficiencies, for example, around 25%, with systems of megawatt capacity.

One prior art method employed to overcome this problem is to employ a recuperator for recovering heat. This recovered heat is typically used to further heat the air stream prior to the stream entering the combustor. Typically, the recuperator improves the system efficiency of the gas turbine upwards to about 30%. A drawback of this solution is that the recuperator is relatively expensive and thus greatly adds to the overall cost of the power system.

Another prior art method employed is to operate the system at a relatively high pressure and a relatively high temperature to thereby increase system efficiency. However, the actual increase in system efficiency has been nominal, while the system is subjected to the costs associated with the high temperature and pressure mechanical components.

Still another prior art method utilized by plants having power capacities above 100 MW is to thermally couple the high temperature exhaust of the turbine with a heat recovery steam generator for a combined gas turbine/steam turbine application. This combined cycle application typically improves the system operating efficiency upwards to about 55%. However, this efficiency is still relatively low.

Thus, there exists a need in the art for high performance power systems. In particular, an improved gas turbine power system that is capable of integrating and employing the desirable properties of electrochemical converters would represent a major improvement in the industry. More particularly, an integrated electrochemical converter and gas turbine system that reduces the costs associated with providing dedicated thermal processing systems while significantly increasing the overall system power efficiency would also represent a major improvement in the art.

SUMMARY OF THE INVENTION

The present invention provides for a power system that integrates an electrochemical converter with a gas turbine. The electrochemical converter and gas turbine constitute a relatively highly efficient power system, e.g., efficiency about 70%, for the production of electricity.

The gas turbine power system of the present invention includes a compressor for compressing a first medium, and an electrochemical converter in fluid communication with the compressor and adapted to receive the first medium and a second medium. The converter is configured to allow an electrochemical reaction between the first and second mediums, thereby producing exhaust having a selected elevated temperature. The power system further includes a turbine in fluid communication with the electrochemical converter and adapted to receive the converter exhaust, such that the turbine converts the electrochemical converter exhaust into rotary energy.

According to one aspect of the invention, the power system further includes a generator which receives the rotary energy of the turbine, and which produces electricity in response to the turbine rotary energy. The electrochemical converter is preferably adapted to operate at an elevated temperature and at various pressures.

According to another aspect, the power system further includes a heat exchanger element, in thermal association with the electrochemical converter, for extracting waste heat from the converter exhaust and for transferring the waste heat to the turbine.

According to still another aspect, the electrochemical converter includes an internal heating element that internally heats the first and second medium to the converter operating temperature. The converter is composed of, in another aspect, a plurality of tubular converter elements which include a circular electrolyte layer having an oxidizer electrode material on one side and a fuel electrode material on the opposing side.

According to another aspect, the electrochemical converter includes an electrochemical converter assembly having a plurality of stacked converter elements which include a plurality of electrolyte plates having an oxidizer electrode material on one side and a fuel electrode material on the opposing side, and a plurality of interconnector plates for providing electrical contact with the electrolyte plates, such that the stack of converter elements is assembled by alternately stacking interconnector plates with the electrolyte plate. In another aspect, the stacked converter elements further include a plurality of manifolds axially associated with the stack and adapted to receive the first and second mediums, and a medium heating element, associated with the manifolds, for heating at least a portion of the first and second mediums to the converter operating temperature.

According to yet another aspect, the interconnector plate is a thermally conductive connector plate, and the medium heating element includes a thermally conductive and integrally formed extended surface, integrally formed with the interconnector plate, and which protrudes into the axial manifolds. In another embodiment, the stack of converter elements includes a plurality of spacer plates interposed between the electrolyte plates and the interconnector plates, and the medium heating element includes a thermally conductive and integrally formed extended surface of the spacer plate that protrudes into the plurality of axial manifolds.

According to one practice of the invention, the electrochemical converter assembly generates waste heat which heats the first and second mediums to the converter operating temperature, and which is conductively transferred to the first and second mediums by the interconnector plate.

According to another aspect, the power system further includes a preheating element for preheating the first and second mediums prior to introduction to the electrochemical converter. The preheating element is preferably either an external regenerative heat exchanger or a radiative heat exchanger. According to another practice of the invention, either the medium heating element or the preheating element can be utilized to disassociate the first and second mediums, which includes hydrocarbons and reforming agents, into non-complex reaction species.

According to another aspect of the invention, the power system further includes a converter exhaust heating element, in communication with the electrochemical converter and the turbine, for heating the exhaust of the converter to a selected elevated temperature prior to introduction to the turbine. The exhaust heating element is preferably a natural gas combustor. The power system can further include a regenerative thermal enclosure element which forms a pressure vessel about the electrochemical converter.

The invention further provides for a steam turbine power system that includes an electrochemical converter for producing exhaust and waste heat having a selected elevated temperature, a steam generator associated with the electrochemical converter, and a turbine associated with the steam generator and configured for producing electricity.

According to one aspect, the steam turbine power system includes a heat exchanger element for radiatively exchanging heat between the converter and the steam generator.

According to another aspect, the power system further includes a heat recovery heat exchanger, associated with the turbine, that receives the converter exhaust and connectively transfers waste heat from the converter exhaust to the turbine.

According to another aspect, the electrochemical converter includes an electrochemical converter assembly having a plurality of stacked converter elements which include a plurality of electrolyte plates having an oxidizer electrode material on one side and a fuel electrode material on the opposing side, and a plurality of interconnector plates for providing electrical contact with the electrolyte plates. The stack of converter elements is assembled by alternately stacking interconnector plates with the electrolyte plate.

According to another aspect, the stacked converter elements further includes a plurality of manifolds axially associated with the stack and adapted to receive reactants, and a reactant heating element, associated with the manifolds, for heating at least a portion of the reactants to the converter operating temperature.

According to still another aspect, the interconnector plate includes a thermally conductive connector plate, and the reactant heating element includes a thermally conductive and integrally formed extended surface of the interconnector plate that protrudes into the plurality of axial manifolds.

In yet another aspect, the stack of converter elements further includes a plurality of spacer plates interposed between the electrolyte plates and the interconnector plates.

According to another aspect, the reactant heating element includes a thermally conductive and integrally formed extended surface of the spacer plate that protrudes into the plurality of axial manifolds.

According to one practice of the invention, the electrochemical converter assembly generates waste heat which heats the reactants to the converter operating temperature. This waste heat is conductively transferred to the reactants by the interconnector plate.

In another aspect, the steam turbine power system further includes a preheating element for preheating the reactants prior to introduction to the electrochemical converter. The preheating element can include an external regenerative heat exchanger or a radiative heat exchanger.

According to another practice, either or both the preheating element or the reactant heating element disassociates the reactants, which includes hydrocarbons and reforming agents, into non-complex reaction species.

The invention further provides for a power system that includes an electrochemical converter adapted to receive input reactants and to produce waste heat and exhaust, and a gas turbine that includes a compressor and a mechanical turbine that produces exhaust having a selected elevated temperature. The system further includes a steam generator that receives the gas turbine exhaust and that radiatively couples the exhaust of the gas turbine to a working medium. The system also includes a steam turbine that is associated with at least the steam generator and that is adapted to receive the working medium.

The invention further provides for a power system that includes an electrochemical converter adapted to receive input reactants and to produce waste heat and exhaust, and a gas turbine that includes a compressor and a mechanical turbine that produces exhaust having a selected elevated temperature. The system further includes a steam generator that receives the gas turbine exhaust and that connectively couples the exhaust of the gas turbine to a working medium. The system also includes a steam turbine that is associated with the steam generator and that is adapted to receive the working medium. According to one practice, power is generated by the electrochemical converter, the steam turbine, and the gas turbine.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
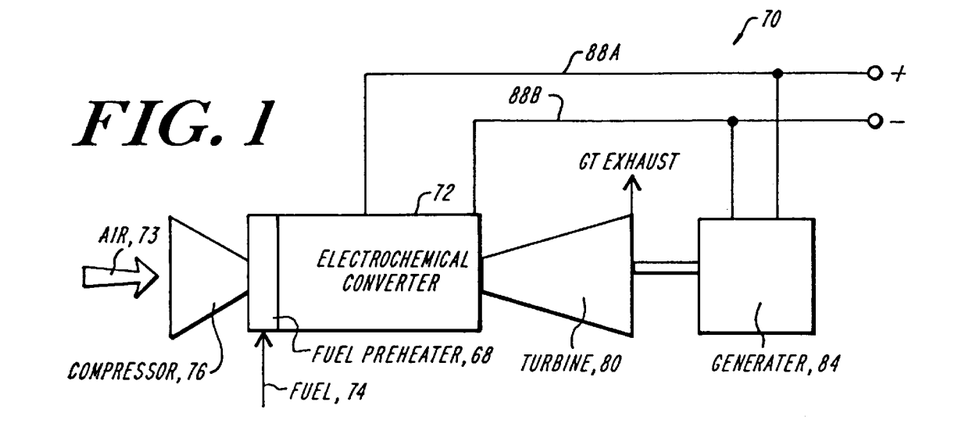
FIG. 1 is a schematic block diagram of a power system employing an electrochemical converter serially in-line with a gas turbine according to the present invention.

FIG. 1 shows a gas turbine power system according to the present invention. The illustrated in-line, aero-derivative gas turbine power system 70 includes an electrochemical converter 72 and a gas turbine assembly. The gas turbine comprises a compressor 76, a turbine 80, and a generator 84. Air from air source 73 is introduced to the compressor 76 by way of any suitable conduit where it is compressed, and thus heated, and then discharged and introduced to the electrochemical converter 72. The fuel 74 is introduced to a preheater 68 where it is preheated to a selected elevated temperature below the converter operating temperature. The heated air and fuel function as input reactants and power the electrochemical converter 72.

The converter 72 heats the compressed air introduced by the compressor 76 and the fuel 74 to produce high temperature exhaust. The exhaust is introduced to the gas turbine 80, which converts this thermal energy into rotary energy, for subsequent transfer to an electric generator 84. The generator 84 produces electricity that can be used for both commercial and residential purposes. One benefit of utilizing the electrochemical converter as the gas turbine combustor is that the converter functions as an additional electric generator. The illustrated electrical connections 88A and 88B show that electricity can be extracted from both the generator 84 and the converter 72. The gas turbine components and generator are art known and commercially available. Those of ordinary skill will readily understand the integration of the electrochemical converter and the gas turbine, especially in light of the present description and illustrations.

Figure 2:
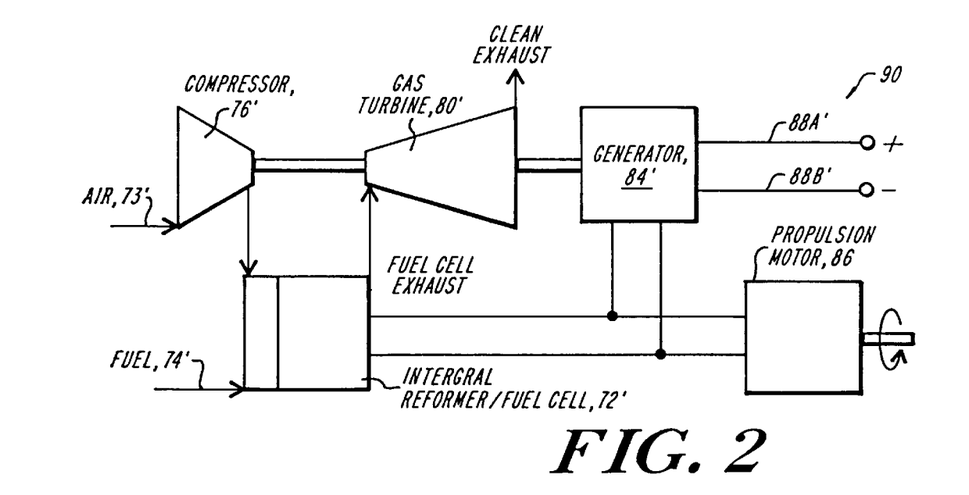
FIG. 2 is a schematic block diagram of an alternate embodiment of a power system employing an electrochemical converter out of line with a gas turbine according to the present invention.

FIG. 2 illustrates a power system 90 where the electrochemical converter 72' is coupled off-line from the gas turbine. Air from the air source 73' is compressed by the compressor 76', discharged, and then introduced to the off-line converter 72'. Fuel from a fuel source 74' is introduced to the converter and the air and fuel are consumed thereby. The converter thermally disassociates the fuel into constituent non-complex reaction species, typically $H_2$ and CO, and creates high temperature exhaust. The exhaust is introduced to the gas turbine 80' which is coupled to the electric generator 84'. The illustrated generator 84' and converter 72' can be used to power the illustrated propulsion motor 86. The system 90 can further employ a preheater, similar to the preheater of FIG. 1, to preheat the reactants prior to introduction to the converter 72.

Figure 3:
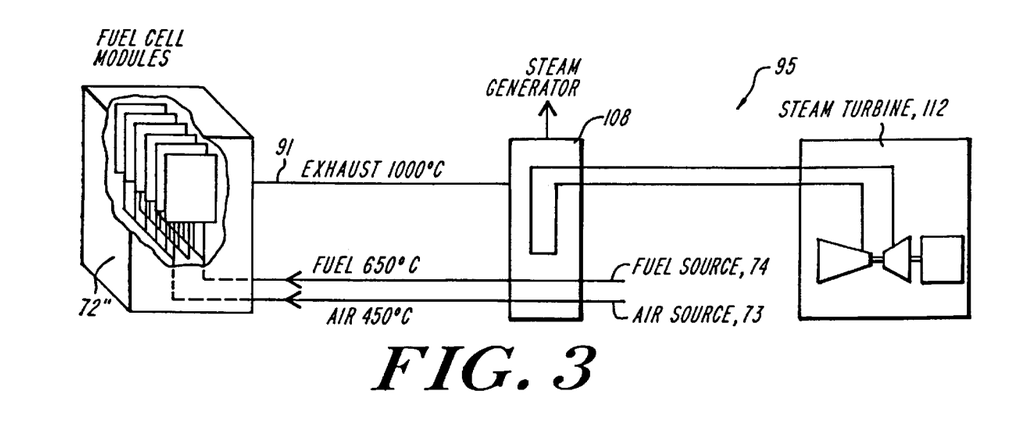
FIG. 3 is a schematic block diagram of a power system employing an electrochemical converter and a steam turbine according to the present invention.

FIG. 3 illustrates a power system 95 that employs an electrochemical converter 72", a heat recovery steam generator 108 (HRSG), and a steam turbine 112, connected as shown. The steam generator 108 functions as a preheater by preheating the input reactants, e.g., air and fuel, to a desirable elevated temperature below the operating temperature of the converter 72'. The converter utilizes the input reactants and creates waste heat and heated exhaust 91. The exhaust 91 can be conveyed to the steam generator 108 by any suitable means, such as a conduit. The heated exhaust helps preheat the reactants 73, 74 by a regenerative heat exchange process, while concomitantly heating working medium associated with the steam turbine, such as water, to produce steam for the steam turbine 112. In an alternate embodiment, the steam generator 108 includes internally a reformer for reforming fuel by thermal disassociation, which typically involves the reformation of hydrocarbons and reforming agents into non-complex reaction species.

Figure 4:
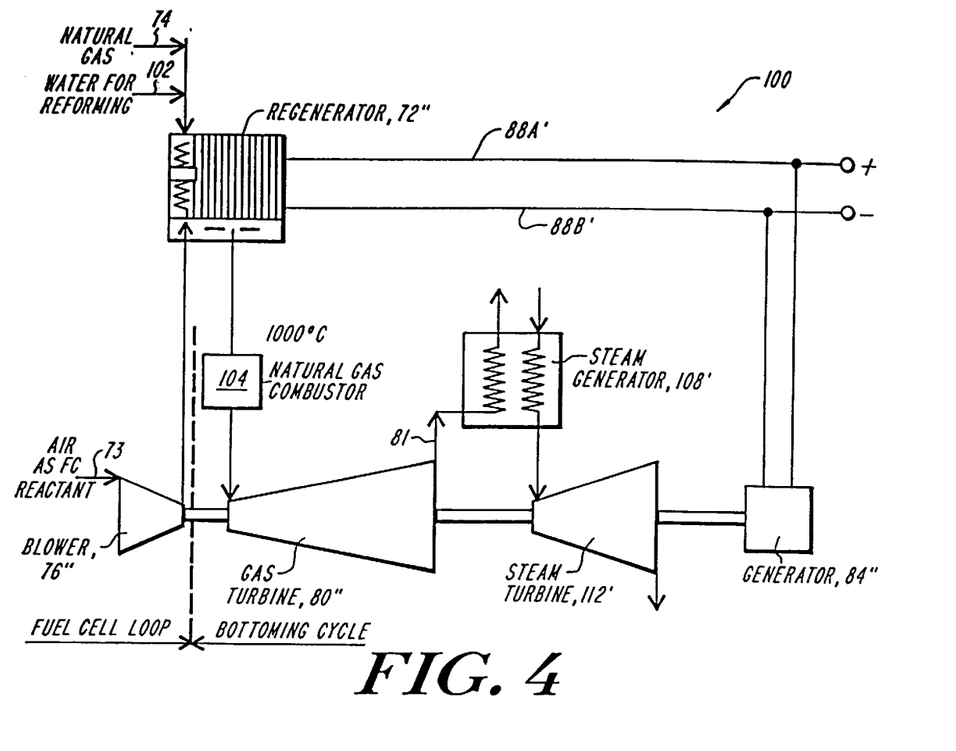
FIG. 4 is a schematic block diagram of another embodiment of a power system employing both a gas turbine, a steam turbine, and a converter exhaust heating element according to the present invention.

FIG. 4 shows an alternate power system 100 that utilizes an electrochemical converter, a gas turbine, and a steam turbine. The power system 100 includes, in addition to the above-listed system components, a secondary combustor 104, a steam generator 108, and a steam turbine 112'. Fuel from a fuel source 74 and water 102 for reforming, generally supplied by a fluid reservoir (not shown), are introduced to the electrochemical converter 72". The water 102 and the waste heat produced by the converter 72" help reform the input fuel, e.g., fossil fuel, into usable non-complex reaction species, e.g., molecular hydrogen and carbon monoxide. Air from the air source 73 is preferably introduced to the converter 72" by way of the compressor or blower 76" and combines with the input fuel to power the converter 72". The converter 72" produces a high temperature exhaust, typically around 1000° C., which is further heated to a selected elevated temperature, e.g., 1300° C., by the secondary combustor 104 to match the predetermined inlet temperature requirements of the gas turbine 80". The gas turbine produces an exhaust output 81 which is passed through a heat recovery steam generator 108 for subsequent use with the bottoming steam turbine 112. The steam turbine output is coupled to the electric generator 84" which produces electricity. Electrical connections 88A' and 88B' indicate that electricity can be directly extracted from both the electrochemical converter 72" and the generator 84".

The illustrated power systems of FIGS. 1–4 provide the advantage in that they allow electricity to be produced in an high efficiency system by the direct integration of a high efficiency, compact electrochemical converter with the bottoming plant constituent components. The integration of the electrochemical converter with a gas turbine in the manner illustrated in FIGS. 1–4 produces a gas turbine power system that has an overall power efficiency of about 70%. This system efficiency represents a significant increase over the efficiencies achieved by prior art gas turbine systems and prior art electrochemical systems. The illustrated gas turbine power systems incorporate an electrochemical converter to provide high grade thermal energy and electricity, while utilizing the benefits of electrochemical converters. For example, the converter operates as a low NOx thermal source, thereby improving environmental performance relative to conventional gas turbine generating plants.

Figure 5:
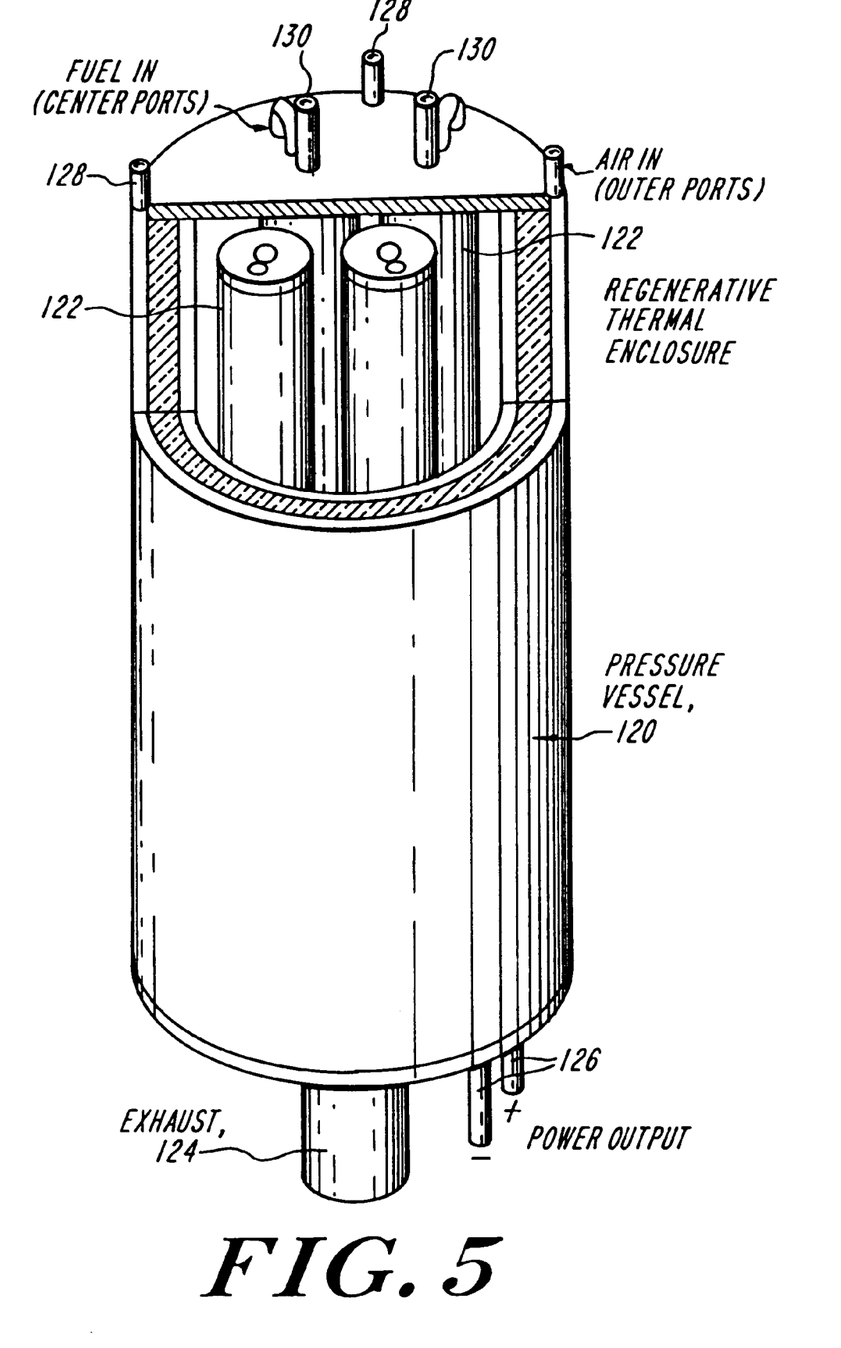
FIG. 5 is a plan view, partially cut-away, of a pressure vessel enclosing a series of electrochemical converters of the present invention.

The direct integration of an electrochemical converter with a gas turbine is aided when the electrochemical converter 72 is housed within a high pressure vessel 120. A preferred type of converter encasement is illustrated in FIG. 5, where a pressure vessel 120, which also functions as a regenerative thermal enclosure, encases a series of stacked fuel cell assemblies 122, which are described in greater detail below. The pressure vessel 120 includes an exhaust outlet manifold 124, electrical connectors 126 and input reactant manifolds 128 and 130. In a preferred embodiment, the oxidizer reactant is introduced to the resident fuel cell assemblies through the centrally located manifolds 130, and the fuel reactant is introduced through the fuel manifolds 128 located about the periphery of the vessel 120.

As described above, the electrochemical converter can be operated at an elevated temperature and at either ambient pressure or at an elevated pressure. The electrochemical converter is preferably a fuel cell system that can include an interdigitated heat exchanger, similar to the type shown and described in U.S. Pat. No. 4,853,100, which is herein incorporated by reference.

Fuel cells typically disassociate fuel by utilizing the chemical potential of selected fuel species, such as hydrogen or carbon monoxide molecules, to produce oxidized molecules in addition to electrical power. Since the cost of supplying molecular hydrogen or carbon monoxide is relatively higher than providing traditional fossil fuels, a fuel processing or reforming step can be utilized to convert the fossil fuels, such as coal and natural gas, to a reactant gas mixture high in hydrogen and carbon monoxide. Consequently, a fuel processor, either dedicated or disposed internally within the fuel cell, is employed to reform, by the use of steam, oxygen, or carbon dioxide (in an endothermic reaction), the fossil fuels into non-complex reactant gases.

Figure 6:
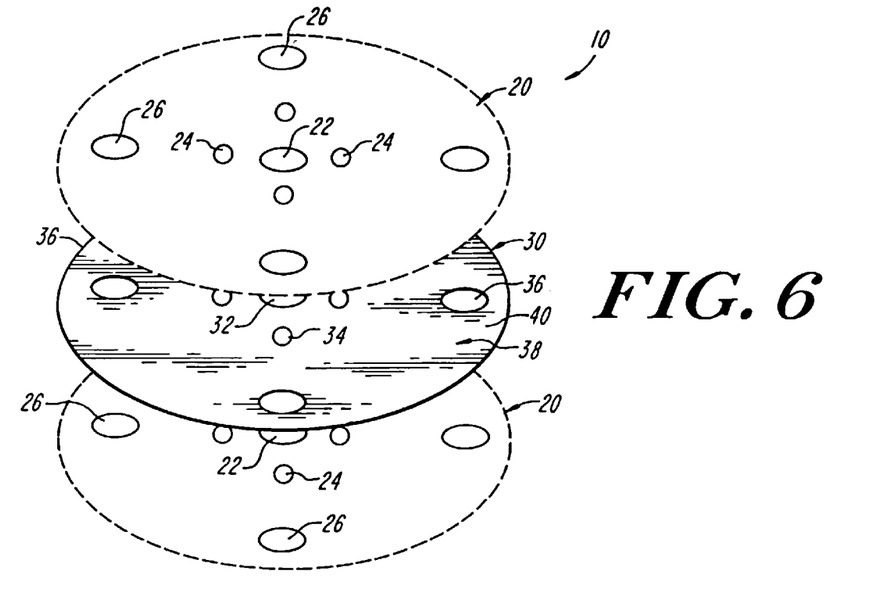
FIG. 6 is a perspective view of a basic cell unit of an electrochemical converter of the invention.
Figure 7:
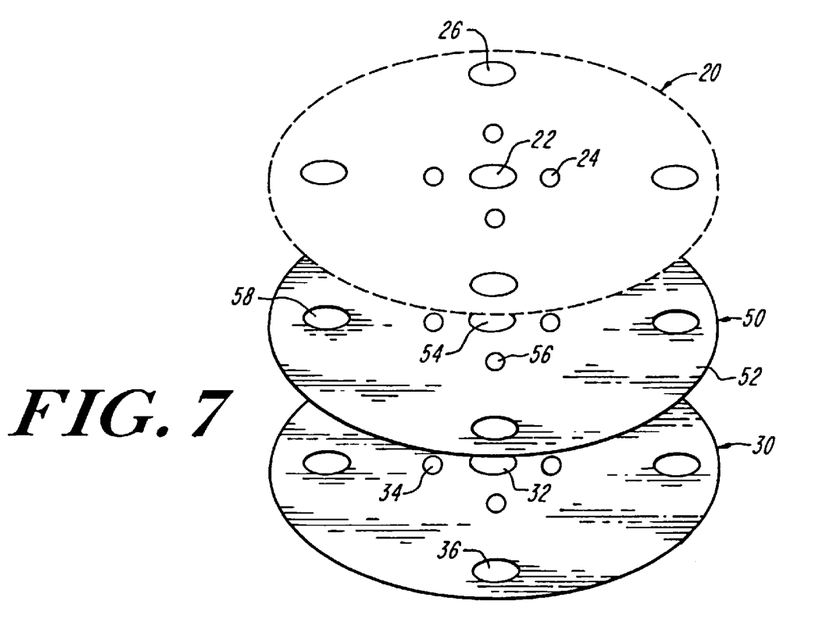
FIG. 7 is a perspective view of an alternate embodiment of the basic cell unit of the electrochemical converter of the present invention.
Figure 8:
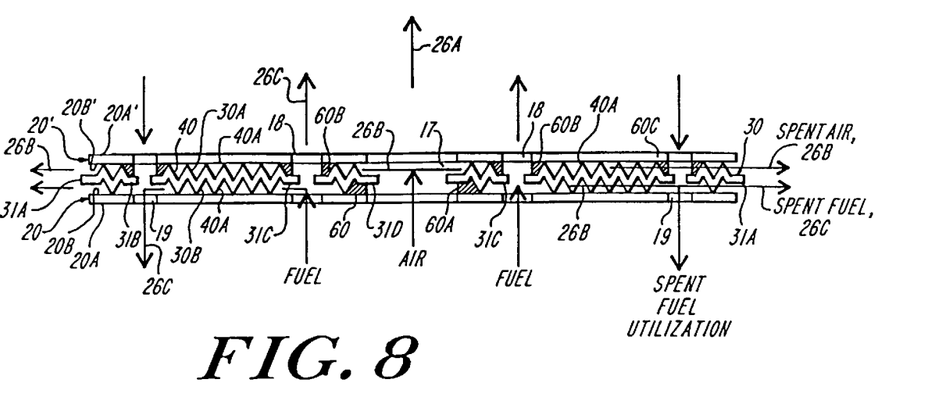
FIG. 8 is a cross-sectional view of the cell unit of FIG. 6.

FIGS. 6–8 illustrate the basic cell unit 10 of the electrochemical converter 72, which is particularly suitable for integration with conventional gas turbines. The cell unit 10 includes an electrolyte plate 20 and an interconnector plate 30. In one embodiment, the electrolyte plate 20 can be made of a ceramic, such as a stabilized zirconia material $ZrO_2$ $(Y_2O_3)$, on which a porous oxidizer electrode material 20A and a porous fuel electrode material 20B are disposed thereon. Exemplary materials for the oxidizer electrode material are perovskite materials, such as $LaMnO_3(Sr)$. Exemplary materials for the fuel electrode material are cermets such as $ZrO_2/Ni$ and $ZrO_2/NiO$.

The interconnector plate 30 preferably is made of an electrically and thermally conductive interconnect material. Examples of such material include nickel alloys, platinum alloys, non-metal conductors such as silicon carbide, $La(Mn)CrO_3$, and preferably commercially available Inconel, manufactured by Inco., U.S.A. The interconnector plate 30 serves as the electric connector between adjacent electrolyte plates and as a partition between the fuel and oxidizer reactants. As best shown in FIG. 8, the interconnector plate 30 has a central aperture 32 and a set of intermediate, concentric radially outwardly spaced apertures 34. A third outer set of apertures 36 are disposed along the outer cylindrical portion or periphery of the plate 30.

The interconnector plate 30 has a textured surface 38. The textured surface preferably has formed thereon a series of dimples 40, as shown in FIG. 8, which form a series of connecting reactant-flow passageways. Preferably, both sides of the interconnector plate 30 have the dimpled surface formed thereon. Although the intermediate and outer set of apertures 34 and 36, respectively, are shown with a selected number of apertures, those of ordinary skill will recognize that any number of apertures or distribution patterns can be employed, depending upon the system and reactant-flow requirements.

Likewise, the electrolyte plate 20 has a central aperture 22, and a set of intermediate and outer apertures 24 and 26 that are formed at locations complementary to the apertures 32, 34 and 36, respectively, of the interconnector plate 30.

Referring to FIG. 7, a spacer plate 50 can be interposed between the electrolyte plate 20 and the interconnector plate 30. The spacer plate 50 preferably has a corrugated surface 52 that forms a series of connecting reactant-flow passageways, similar to the interconnecting plate 30. The spacer plate 50 also has a number of concentric apertures 54, 56, and 58 that are at locations complementary to the apertures of the interconnect and electrolyte plates, as shown. Further, in this arrangement, the interconnector plate 30 is devoid of reactant-flow passageways. The spacer plate 50 is preferably made of an electrically conductive material, such as nickel.

The illustrated electrolyte plates 20, interconnector plates 30, and spacer plates 50 can have any desirable geometric configuration. Furthermore, the plates having the illustrated manifolds can extend outwardly in repetitive or non-repetitive patterns, and thus are shown in dashed lines.

Referring to FIG. 8, when the electrolyte plates 20 and the interconnector plates 30 are alternately stacked and aligned along their respective apertures, the apertures form axial (with respect to the stack) manifolds that feed the cell unit with the input reactants and that exhaust spent fuel. In particular, the aligned central apertures 22, 32, 22' form input oxidizer manifold 17, the aligned concentric apertures 24, 34, 24' form input fuel manifold 18, and the aligned outer apertures 26, 36, 26' form spent fuel manifold 19.

The dimpled surface 38 of the interconnector plate 30 has, in the cross-sectional view of FIG. 8, a substantially corrugated pattern formed on both sides. This corrugated pattern forms the reactant-flow passageways that channel the input reactants towards the periphery of the interconnector plates. The interconnector plate also has an extended heating surface or lip structure that extends within each axial manifold and about the periphery of the interconnector plate. Specifically, the interconnector plate 30 has a flat annular extended surface 31A formed along its outer peripheral edge. In a preferred embodiment, the illustrated heating surface 31A extends beyond the outer peripheral edge of the electrolyte plate 20. The interconnector plate further has an extended heating surface that extends within the axial manifolds, for example, edge 31B extends into and is housed within the axial manifold 19; edge 31C extends into and is housed within the axial manifold 18; and edge 31D extends into and is housed within the axial manifold 17. The extended heating surfaces can be integrally formed with the interconnector plate or can be coupled or attached thereto. The heating surface need not be made of the same material as the interconnector plate, but can comprise any suitable thermally conductive material that is capable of withstanding the operating temperature of the electrochemical converter. In an alternate embodiment, the extended heating surface can be integrally formed with or coupled to the spacer plate.

The absence of a ridge or other raised structure at the interconnector plate periphery provides for exhaust ports that communicate with the external environment. The reactant-flow passageways connect, fluidwise, the input reactant manifolds with the outer periphery, thus allowing the reactants to be exhausted to the external environment, or to a thermal container or pressure vessel disposed about the electrochemical converter, FIG. 5.

Referring again to FIG. 8, the illustrated sealer material 60 can be applied to portions of the interconnector plate 30 at the manifold junctions, thus allowing selectively a particular input reactant to flow across the interconnector surface and across the mating surface of the electrolyte plate 20. The interconnector plate bottom 30B contacts the fuel electrode coating 20B of the electrolyte plate 20. In this arrangement, it is desirable that the sealer material only allow fuel reactant to enter the reactant-flow passageway, and thus contact the fuel electrode.

As illustrated, the sealer material 60A is disposed about the input oxidizer manifold 17, forming an effective reactant flow barrier about the oxidizer manifold 17. The sealer material helps maintain the integrity of the fuel reactant contacting the fuel electrode side 20B of the electrolyte plate 20, as well as maintain the integrity of the spent fuel exhausted through the spent fuel manifold 19.

The top 30A of the interconnector plate 30 has the sealer material 60B disposed about the fuel input manifolds 18 and the spent fuel manifold 19. The top of the interconnector plate 30A contacts the oxidizer coating 20B' of an opposing electrolyte plate 20'. Consequently, the junction at the input oxidizer manifold 17 is devoid of sealer material, thereby allowing the oxidizer reactant to enter the reactant-flow passageways. The sealer material 60B that completely surrounds the fuel manifolds 18 inhibits the excessive leakage of the fuel reactant into the reactant-flow passageways, thus inhibiting the mixture of the fuel and oxidizer reactants.

Similarly, the sealer material 60C that completely surrounds the spent fuel manifold 19 inhibits the flow of spent oxidizer reactant into the spent fuel manifold 19. Hence, the purity of the spent fuel that is pumped through the manifold 19 is maintained.

Referring again to FIG. 8, the oxidizer reactant can be introduced to the electrochemical converter through axial manifold 17 that is formed by the apertures 22, 32, and 22' of the electrolyte and interconnector plates, respectively. The oxidizer is distributed over the top of the interconnector plate 30A, and over the oxidizer electrode surface 20A' by the reactant-flow passageways. The spent oxidizer then flows radially outward toward the peripheral edge 31A, and is finally discharged along the converter element periphery. The sealer material 60C inhibits the flow of oxidizer into the spent fuel manifold 19. The flow path of the oxidizer through the axial manifolds is depicted by solid black arrows 26A, and through the oxidizer cell unit by the solid black arrows 26B.

The fuel reactant is introduced to the electrochemical converter 10 by way of fuel manifold 18 formed by the aligned apertures 24, 34, and 24' of the plates. The fuel is introduced to the reactant-flow passageways and is distributed over the bottom of the interconnector plate 30B, and over the fuel electrode coating 20B of the electrolyte plate 20. Concomitantly, the sealer material 60A, prevents the input oxidizer reactant from entering the reactant-flow passageways and thus mixing with the pure fuel/spent fuel reactant mixture. The absence of any sealer material at the spent fuel manifold 19 allows spent fuel to enter the manifold 19. The fuel is subsequently discharged along the annular edge 31A of the interconnector plate 30. The flow path of the fuel reactant is illustrated by the solid black arrows 26C.

The dimples 40 of the interconnector surface have an apex 40A that contact the electrolyte plates, in assembly, to establish an electrical connection therebetween.

A wide variety of conductive materials can be used for the thin electroconnector plates of this invention. Such materials should meet the following requirements: (1) high strength, as well as electrical and thermal conductivity; (2) good oxidation resistance up to the working temperature; (3) chemical compatibility and stability with the input reactants; and (4) manufacturing economy when formed into the textured plate configuration exemplified by reactant-flow passageways.

The suitable materials for interconnector fabrication include nickel alloys, nickel-chromium alloys, nickel-chromium-iron alloys, iron-chromium-aluminum alloys, platinum alloys, cermets of such alloys and refractory material such as zirconia or alumina, silicon carbide and molybdenum disilicide.

The textured patterns of the top and bottom of the interconnector plate can be obtained, for example, by stamping the metallic alloy sheets with one or more sets of matched male and female dies. The dies are preferably prefabricated according to the desired configuration of the interconnector plate, and can be hardened by heat treatment to withstand the repetitive compressing actions and mass productions, as well as the high operating temperatures. The stamp forming process for the interconnectors is preferably conducted in multiple steps due to the geometrical complexity of the gas passage networks, e.g., the dimpled interconnector plate surface. The manifolds formed in the interconnector plates are preferably punched out at the final step. Temperature annealing is recommended between the consecutive steps to prevent the overstressing of sheet material. The stamping method is capable of producing articles of varied and complex geometry while maintaining uniform material thickness.

Alternatively, corrugated interconnectors can be formed by electro-deposition on an initially flat metal plate using a set of suitable masks. Silicon carbide interconnector plates can be formed by vapor deposition onto pre-shaped substrates, by sintering of bonded powders, or by self-bonding processes.

The oxidizer and fuel reactants are preferably preheated to a suitable temperature prior to entering the electrochemical converter. This preheating can be performed by any suitable heating structure, such as a regenerative heat exchanger or a radiative heat exchanger, for heating the reactants to a temperature sufficient to reduce the amount of thermal stress applied to the converter.

Another significant feature of the present invention is that the extended heating surfaces 31D and 31C heat the reactants contained within the oxidizer and fuel manifolds 17 and 18 to the operating temperature of the converter. Specifically, the extended surface 31D that protrudes into the oxidizer manifold 17 heats the oxidizer reactant, and the extended surface 31C that protrudes into the fuel manifold 18 heats the fuel reactant. The highly thermally conductive interconnector plate 30 facilitates heating of the input reactants by conductively transferring heat from the fuel cell internal surface, e.g., the middle region of the conductive interconnector plate, to the extended surfaces or lip portions, thus heating the input reactants to the operating temperature prior to traveling through reactant flow passageways. The extended surfaces thus function as a heat fin. This reactant heating structure provides a compact converter that is capable of being integrated with an electricity generating power system, and further provides a highly efficient system that is relatively low in cost. Electrochemical converters incorporating fuel cell components constructed according to these principles and employed in conjunction with a gas turbine provides a power system having a relatively simple system configuration.

The operating temperature of the electrochemical converter is preferably between about 20° C. and 1500° C., and the preferred fuel cell types employed by the present invention are solid oxide fuel cells, molten carbonate fuel cells, alkaline fuel cells, phosphoric acid fuel cells, and proton membrane fuel cells.

In an alternate embodiment, the electrolyte and interconnector plates can have a substantially tubular shape and have an oxidizer electrode material disposed on one side and a fuel electrode material disposed on the opposing side. The plates can then be stacked together in a like manner.

It will thus be seen that the invention contains improvements over the prior art. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween. For example, the electrochemical converter employing the interconnector plate edge extensions of the present invention can also employ molten carbonate, phosphoric acid, alkaline and proton exchange membrane electrochemical converters and other like converters.

What is claimed is:

1. A gas turbine power system for producing electricity, comprising a compressor for compressing a first medium, an electrochemical converter in fluid communication with the compressor and being adapted to receive the first medium and a second medium, the converter being configured to allow electrochemical reaction between the first and second mediums and to produce exhaust having a selected elevated temperature, a turbine in fluid communication with the electrochemical converter and adapted to receive the converter exhaust, and a generator associated with the turbine and adapted to receive the rotary energy thereof, wherein the generator produces electricity in response to the turbine rotary energy, wherein the turbine converts the electrochemical converter exhaust into rotary energy.

2. The gas turbine power system of claim 1, wherein the electrochemical converter is adapted to produce electricity.

3. The gas turbine power system of claim 1, wherein the electrochemical converter is adapted to operate at an elevated temperature and at atmospheric pressure, and wherein said power system further comprises heat exchanger means in thermal association with the electrochemical converter for extracting waste heat from the converter exhaust and for transferring the waste heat to the turbine.

4. The gas turbine power system of claim 1, wherein the electrochemical converter has a selected operating temperature and is adapted to operate at an elevated temperature and at an elevated pressure, wherein the electrochemical converter includes internal medium heating means for internally heating the first and second mediums to the converter operating temperature.

5. The gas turbine power system of claim 1, wherein the electrochemical converter comprises an electrochemical converter assembly having a plurality of stacked converter elements which include a plurality of electrolyte plates having an oxidizer electrode material on one side and a fuel electrode material on the opposing side, and a plurality of interconnector plates for providing electrical contact with the electrolyte plates, wherein the stack of converter elements is assembled by alternately stacking interconnector plates with the electrolyte plate.

6. The gas turbine power system of claim 5, wherein the stacked converter elements further include a plurality of manifolds axially associated with the stack and adapted to receive the first and second mediums, and medium heating means associated with the manifold for heating at least a portion of the first and second mediums to the operating temperature of the converter.

7. The gas turbine power system of claim 6, wherein the interconnector plate comprises a thermally conductive connector plate.

8. The gas turbine power system of claim 6, wherein the medium heating means comprises a thermally conductive and integrally formed extended surface of the interconnector plate that protrudes into the axial manifolds.

9. The gas turbine power system of claim 6, wherein the stack of converter elements further comprises a plurality of spacer plates interposed between the electrolyte plates and the interconnector plates.

10. The gas turbine power system of claim 9, wherein the medium heating means comprises a thermally conductive and integrally formed extended surface of the spacer plate that protrudes into the plurality of axial manifolds.

11. The gas turbine power system of claim 6, wherein the electrochemical converter assembly generates waste heat which heats the first and second mediums to the converter operating temperature, the waste heat being conductively transferred to the first and second mediums by the interconnector plate.

12. The gas turbine power system of claim 1, further comprising preheating means for preheating one of the first and second mediums prior to introduction to the electrochemical converter.

13. The gas turbine power system of claim 12, wherein the preheating means comprises one of an external regenerative heat exchanger and a radiative heat exchanger.

14. The gas turbine power system of claim 12, wherein at least the preheating means comprises means for disassociating the first and second mediums, which includes hydrocarbons and reforming agents, into non-complex reaction species.

15. The gas turbine power system of claim 1, wherein the electrochemical converter is placed serially in-line between the compressor and the turbine.

16. The gas turbine power system of claim 1, further comprising converter exhaust heating means, disposed between the electrochemical converter and the turbine, for heating the exhaust of the converter to a selected elevated temperature prior to introduction to the turbine.

17. The gas turbine power system of claim 16, wherein the converter exhaust heating means comprises a natural gas combustor.

18. The gas turbine power system of claim 1 further comprising regenerative thermal enclosure means forming a pressure vessel about the electrochemical converter.

19. The gas turbine power system of claim 1, further comprising a steam generator associated with the gas turbine and adapted to receive the gas turbine exhaust, the steam generator convectively coupling the exhaust of the gas turbine to a working medium.

20. The gas turbine power system of claim 19, further comprising a steam turbine associated with the steam generator and configured for producing electricity.

21. The gas turbine power system of claim 1, wherein said one or more turbines are coupled to said one or more compressors by at least one or more shafts.

22. A gas turbine power system for producing electricity, comprising a compressor for compressing a first medium, an electrochemical converter in fluid communication with the compressor and being adapted to receive the first medium and a second medium, the converter being configured to allow electrochemical reaction between the first and second mediums and to produce exhaust having a selected elevated temperature, wherein the electrochemical converter is adapted to produce electricity, and a turbine in fluid communication with the electrochemical converter and adapted to receive the converter exhaust, wherein the turbine converts the electrochemical converter exhaust into rotary energy.

23. The gas turbine power system of claim 22, further comprising a generator associated with the turbine and adapted to receive the rotary energy thereof, wherein the generator produces electricity in response to the turbine rotary energy.

24. The gas turbine power system of claim 22, wherein the electrochemical converter is adapted to operate at an elevated temperature and at atmospheric pressure, and wherein said power system further comprises heat exchanger means in thermal association with the electrochemical converter for extracting waste heat from the converter exhaust and for transferring the waste heat to the turbine.

25. The gas turbine power system of claim 22, wherein the electrochemical converter has a selected operating temperature and is adapted to operate at an elevated temperature and at an elevated pressure, wherein the electrochemical converter includes internal medium heating means for internally heating the first and second mediums to the converter operating temperature.

26. The gas turbine power system of claim 22, wherein the electrochemical converter comprises an electrochemical converter assembly having a plurality of stacked converter elements which include
a plurality of electrolyte plates having an oxidizer electrode material on one side and a fuel electrode material on the opposing side, and
a plurality of interconnector plates for providing electrical contact with the electrolyte plates, wherein the stack of converter elements is assembled by alternately stacking interconnector plates with the electrolyte plate.

27. The gas turbine power system of claim 26, wherein the stacked converter elements further include
a plurality of manifolds axially associated with the stack and adapted to receive the first and second mediums, and
medium heating means associated with the manifold for heating at least a portion of the first and second mediums to the operating temperature of the converter.

28. The gas turbine power system of claim 27, wherein the interconnector plate comprises a thermally conductive connector plate.

29. The gas turbine power system of claim 27, wherein the medium heating means comprises a thermally conductive and integrally formed extended surface of the interconnector plate that protrudes into the axial manifolds.

30. The gas turbine power system of claim 27, wherein the stack of converter elements further comprises a plurality of spacer plates interposed between the electrolyte plates and the interconnector plates.

31. The gas turbine power system of claim 30, wherein the medium heating means comprises a thermally conductive and integrally formed extended surface of the spacer plate that protrudes into the plurality of axial manifolds.

32. The gas turbine power system of claim 22, further comprising preheating means for preheating the first and second mediums prior to introduction to the electrochemical converter.

33. The gas turbine power system of claim 32, wherein the preheating means comprises one of an external regenerative heat exchanger and a radiative heat exchanger.

34. The gas turbine power system of claim 32, wherein at least the preheating means comprises means for disassociating the first and second mediums, which includes hydrocarbons and reforming agents, into non-complex reaction species.

35. The gas turbine power system of claim 32, wherein the electrochemical converter is placed serially in-line between the compressor and the turbine.

36. The gas turbine power system of claim 22, further comprising converter exhaust heating means, disposed between the electrochemical converter and the turbine, for heating the exhaust of the converter to a selected elevated temperature prior to introduction to the turbine.

37. The gas turbine power system of claim 36, wherein the converter exhaust heating means comprises a natural gas combustor.

38. The gas turbine power system of claim 22, further comprising regenerative thermal enclosure means forming a pressure vessel about the electrochemical converter.

39. The gas turbine power system of claim 22, further comprising a steam generator associated with the gas turbine and adapted to receive the gas turbine exhaust, the steam generator convectively coupling the exhaust of the gas turbine to a working medium.

40. The gas turbine power system of claim 39, further comprising a steam turbine associated with the steam generator and configured for producing electricity.

41. A gas turbine power system for producing electricity, comprising
a compressor for compressing a first medium,
an electrochemical converter in fluid communication with the compressor and being adapted to receive the first medium and a second medium, the converter being configured to allow electrochemical reaction between the first and second mediums and to produce exhaust having a selected elevated temperature, wherein the electrochemical converter includes an electrochemical converter assembly having a plurality of stacked converter elements which include
a plurality of electrolyte plates having an oxidizer electrode material on one side and a fuel electrode material on the opposing side, and
a plurality of interconnector plates for providing electrical contact with the electrolyte plates, wherein the stack of converter elements is assembled by alternately stacking interconnector plates with the electrolyte plate, and
a turbine in fluid communication with the electrochemical converter and adapted to receive the converter exhaust, wherein the turbine converts the electrochemical converter exhaust into rotary energy.

42. The gas turbine power system of claim 41, further comprising a generator associated with the turbine and adapted to receive the rotary energy thereof, wherein the generator produces electricity in response to the turbine rotary energy.

43. The gas turbine power system of claim 41, wherein the electrochemical converter is adapted to produce electricity.

44. The gas turbine power system of claim 41, wherein the electrochemical converter is adapted to operate at an elevated temperature and at atmospheric pressure, and wherein said power system further comprises heat exchanger means in thermal association with the electrochemical converter for extracting waste heat from the converter exhaust and for transferring the waste heat to the turbine.

45. The gas turbine power system of claim 41, wherein the electrochemical converter has a selected operating temperature and is adapted to operate at an elevated temperature and at an elevated pressure, wherein the electrochemical converter includes internal medium heating means for internally heating the first and second mediums to the converter operating temperature.

46. The gas turbine power system of claim 41, wherein the stacked converter elements further include
a plurality of manifolds axially associated with the stack and adapted to receive the first and second mediums, and medium heating means associated with the manifold for heating at least a portion of the first and second mediums to the operating temperature of the converter.

47. The gas turbine power system of claim 46, wherein the medium heating means comprises a thermally conductive and integrally formed extended surface of the interconnector plate that protrudes into the axial manifolds.

48. The gas turbine power system of claim 46, wherein the stack of converter elements further comprises a plurality of spacer plates interposed between the electrolyte plates and the interconnector plates.

49. The gas turbine power system of claim 48, wherein the medium heating means comprises a thermally conductive and integrally formed extended surface of the spacer plate that protrudes into the plurality of axial manifolds.

50. The gas turbine power system of claim 41, wherein the interconnector plate comprises a thermally conductive connector plate.

51. The gas turbine power system of claim 41, further comprising preheating means for preheating the first and second mediums prior to introduction to the electrochemical converter.

52. The gas turbine power system of claim 51, wherein the preheating means comprises one of an external regenerative heat exchanger and a radiative heat exchanger.

53. The gas turbine power system of claim 41, further comprising converter exhaust heating means, disposed between the electrochemical converter and the turbine, for heating the exhaust of the converter to a selected elevated temperature prior to introduction to the turbine.

54. The gas turbine power system of claim 53, wherein the converter exhaust heating means comprises a natural gas combustor.

55. The gas turbine power system of claim 41, further comprising regenerative thermal enclosure means forming a pressure vessel about the electrochemical converter.

56. The gas turbine power system of claim 41, further comprising a steam generator associated with the gas turbine and adapted to receive the gas turbine exhaust, the steam generator convectively coupling the exhaust of the gas turbine to a working medium.

57. The gas turbine power system of claim 56, further comprising a steam turbine associated with the steam generator and configured for producing electricity.

58. A gas turbine power system for producing electricity, comprising
  a compressor for compressing a first medium,
  an electrochemical converter in fluid communication with the compressor and being adapted to receive the first medium and a second medium, the converter being configured to allow electrochemical reaction between the first and second mediums and to produce exhaust having a selected elevated temperature,
  a turbine in fluid communication with the electrochemical converter and adapted to receive the converter exhaust, wherein the turbine converts the electrochemical converter exhaust into rotary energy, and
  one of an external regenerative heat exchanger and a radiative heat exchanger for preheating the first and second mediums prior to introduction to the electrochemical converter.

59. The gas turbine power system of claim 58, further comprising a generator associated with the turbine and adapted to receive the rotary energy thereof, wherein the generator produces electricity in response to the turbine rotary energy.

60. The gas turbine power system of claim 58, wherein the electrochemical converter is adapted to produce electricity.

61. The gas turbine power system of claim 58, wherein the electrochemical converter is adapted to operate at an elevated temperature and at atmospheric pressure, and wherein said power system further comprises heat exchanger means in thermal association with the electrochemical converter for extracting waste heat from the converter exhaust and for transferring the waste heat to the turbine.

62. The gas turbine power system of claim 58, wherein the electrochemical converter has a selected operating temperature and is adapted to operate at an elevated temperature and at an elevated pressure, wherein the electrochemical converter includes internal medium heating means for internally heating the first and second mediums to the converter operating temperature.

63. The gas turbine power system of claim 58, wherein the electrochemical converter comprises
  an electrochemical converter assembly having a plurality of stacked converter elements which include
    a plurality of electrolyte plates having an oxidizer electrode material on one side and a fuel electrode material on the opposing side, and
    a plurality of interconnector plates for providing electrical contact with the electrolyte plates, wherein the stack of converter elements is assembled by alternately stacking interconnector plates with the electrolyte plate.

64. The gas turbine power system of claim 63, wherein the stacked converter elements further include
  a plurality of manifolds axially associated with the stack and adapted to receive the first and second mediums, and
  medium heating means associated with the manifold for heating at least a portion of the first and second mediums to the operating temperature of the converter.

65. The gas turbine power system of claim 64, wherein the medium heating means comprises a thermally conductive and integrally formed extended surface of the interconnector plate that protrudes into the axial manifolds.

66. The gas turbine power system of claim 64, wherein the stack of converter elements further comprises a plurality of spacer plates interposed between the electrolyte plates and the interconnector plates.

67. The gas turbine power system of claim 66, wherein the medium heating means comprises a thermally conductive and integrally formed extended surface of the spacer plate that protrudes into the plurality of axial manifolds.

68. The gas turbine power system of claim 63, wherein the interconnector plate comprises a thermally conductive connector plate.

69. The gas turbine power system of claim 58, further comprising converter exhaust heating means, disposed between the electrochemical converter and the turbine, for heating the exhaust of the converter to a selected elevated temperature prior to introduction to the turbine.

70. The gas turbine power system of claim 69, wherein the converter exhaust heating means comprises a natural gas combustor.

71. The gas turbine power system of claim 58, further comprising regenerative thermal enclosure means forming a pressure vessel about the electrochemical converter.

72. The gas turbine power system of claim 58, further comprising a steam generator associated with the gas turbine and adapted to receive the gas turbine exhaust, the steam generator convectively coupling the exhaust of the gas turbine to a working medium.

73. The gas turbine power system of claim 72, further comprising a steam turbine associated with the steam generator and configured for producing electricity.

74. A gas turbine power system for producing electricity, comprising
- a compressor for compressing a first medium,
- an electrochemical converter in fluid communication with the compressor and being adapted to receive the first medium and a second medium, the converter being configured to allow electrochemical reaction between the first and second mediums and to produce exhaust having a selected elevated temperature,
- a turbine in fluid communication with the electrochemical converter and adapted to receive the converter exhaust, wherein the turbine converts the electrochemical converter exhaust into rotary energy, and
- a pressure vessel disposed about the electrochemical converter.

75. The gas turbine power system of claim 74, further comprising a generator associated with the turbine and adapted to receive the rotary energy thereof, wherein the generator produces electricity in response to the turbine rotary energy.

76. The gas turbine power system of claim 74, wherein the electrochemical converter is adapted to produce electricity.

77. The gas turbine power system of claim 74, wherein the electrochemical converter is adapted to operate at an elevated temperature and at atmospheric pressure, and wherein said power system further comprises heat exchanger means in thermal association with the electrochemical converter for extracting waste heat from the converter exhaust and for transferring the waste heat to the turbine.

78. The gas turbine power system of claim 74, wherein the electrochemical converter has a selected operating temperature and is adapted to operate at an elevated temperature and at an elevated pressure, wherein the electrochemical converter includes internal medium heating means for internally heating the first and second mediums to the converter operating temperature.

79. The gas turbine power system of claim 74, wherein the electrochemical converter comprises
- an electrochemical converter assembly having a plurality of stacked converter elements which include
  - a plurality of electrolyte plates having an oxidizer electrode material on one side and a fuel electrode material on the opposing side, and
  - a plurality of interconnector plates for providing electrical contact with the electrolyte plates, wherein the stack of converter elements is assembled by alternately stacking interconnector plates with the electrolyte plate.

80. The gas turbine power system of claim 79, wherein the stacked converter elements further comprises
- a plurality of manifolds axially associated with the stack and adapted to receive the first and second mediums, and
- medium heating means associated with the manifold for heating at least a portion of the first and second mediums to the operating temperature of the converter.

81. The gas turbine power system of claim 80, wherein the medium heating means comprises a thermally conductive and integrally formed extended surface of the interconnector plate that protrudes into the axial manifolds.

82. The gas turbine power system of claim 80, wherein the stack of converter elements further comprises a plurality of spacer plates interposed between the electrolyte plates and the interconnector plates.

83. The gas turbine power system of claim 82, wherein the medium heating means comprises a thermally conductive and integrally formed extended surface of the spacer plate that protrudes into the plurality of axial manifolds.

84. The gas turbine power system of claim 74, further comprising preheating means for preheating the first and second mediums prior to introduction to the electrochemical converter.

85. The gas turbine power system of claim 84, wherein the preheating means comprises one of an external regenerative heat exchanger and a radiative heat exchanger.

86. The gas turbine power system of claim 74, further comprising converter exhaust heating means, disposed between the electrochemical converter and the turbine, for heating the exhaust of the converter to a selected elevated temperature prior to introduction to the turbine.

87. The gas turbine power system of claim 86, wherein the converter exhaust heating means comprises a natural gas combustor.

88. The gas turbine power system of claim 74, further comprising a steam generator associated with the gas turbine and adapted to receive the gas turbine exhaust, the steam generator convectively coupling the exhaust of the gas turbine to a working medium.

89. The gas turbine power system of claim 88, further comprising a steam turbine associated with the steam generator and configured for producing electricity.

90. An electrochemical converter assembly, comprising
- a stack of converter plate elements including
  - a plurality of electrolyte plates having an oxidizer electrode material on one side and a fuel electrode material on the opposing side;
  - a plurality of interconnector plates for providing electrical contact with said electrolyte plates, wherein said stack of converter elements is assembled by alternately stacking interconnector plates with said electrolyte plates: and
  - at least one manifold axially associated with said stack and adapted to receive reactants, said converter assembly operating at a selected operating temperature, and
- reactant heating means disposed within said manifold for heating at least a portion of one of said reactants to said operating temperature of said converter assembly while passing through said manifolds.

91. The electrochemical converter assembly of claim 90, wherein said manifold is disposed about said stack of converter plate elements.

92. The electrochemical converter assembly of claim 90, wherein said manifold is formed in one of the electrolyte and interconnector plates.

93. A gas turbine power system for producing electricity, comprising
- a compressor for compressing a first medium,
- an electrochemical converter in fluid communication with the compressor and being adapted to receive the first medium and a second medium, the converter being configured to allow electrochemical reaction between the first and second mediums to produce exhaust, said exhaust including non-complex reaction species and having a selected elevated temperature,
- a turbine in fluid communication with the electrochemical converter and adapted to receive directly the converter exhaust,
- wherein the turbine converts the electrochemical converter exhaust into rotary energy.

* * * * *

UNITED STATES PATENT AND TRADEMARK OFFICE
CERTIFICATE OF CORRECTION

PATENT NO. : 5,976,332
DATED : November 2, 1999
INVENTOR(S) : Hsu et al.

It is certified that error appears in the above-identified patent and that said Letters Patent is hereby corrected as shown below:

In the Title:

Replace:

"ULTRA-HIGH EFFICIENCY TURBINE AND CELL COMBINATION"

with:

"ULTRA-HIGH EFFICIENCY TURBINE AND FUEL CELL COMBINATION"

Signed and Sealed this

Twenty-third Day of May, 2000

Attest:

Q. TODD DICKINSON

*Attesting Officer*      *Director of Patents and Trademarks*